Oct. 17, 1961   A. C. MULLER   3,004,482
FILM AND SHUTTER WINDING MECHANISM FOR PHOTOGRAPHIC CAMERAS
Filed Oct. 28, 1959   2 Sheets-Sheet 1
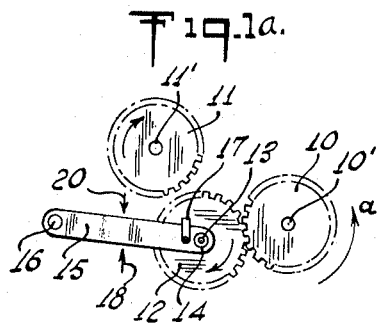
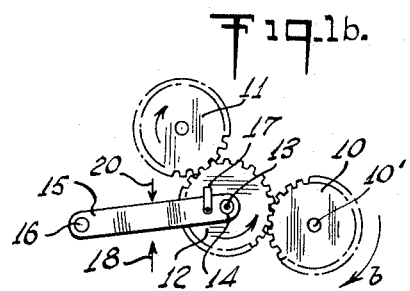
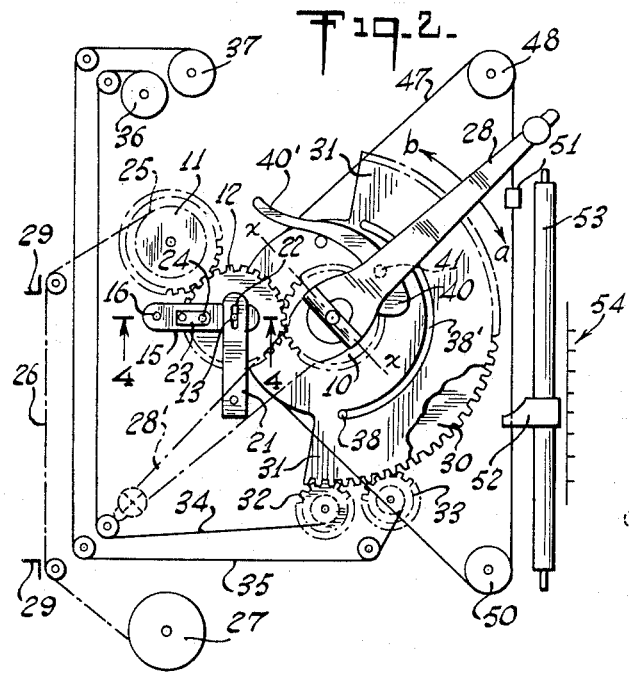
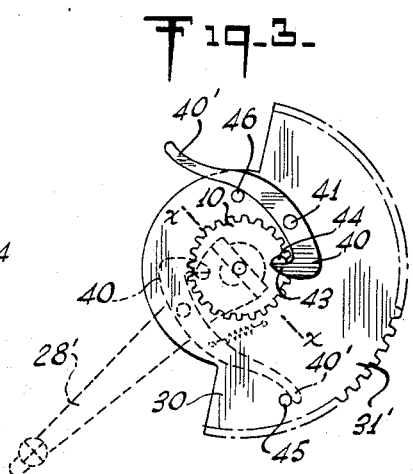
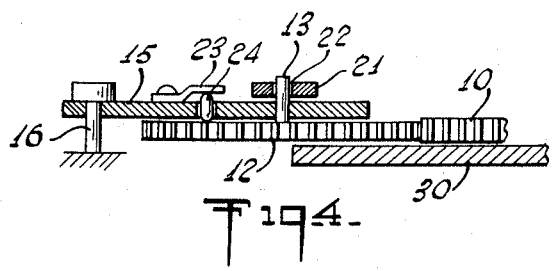
INVENTOR
ALEX C. MULLER
BY
ATTORNEY

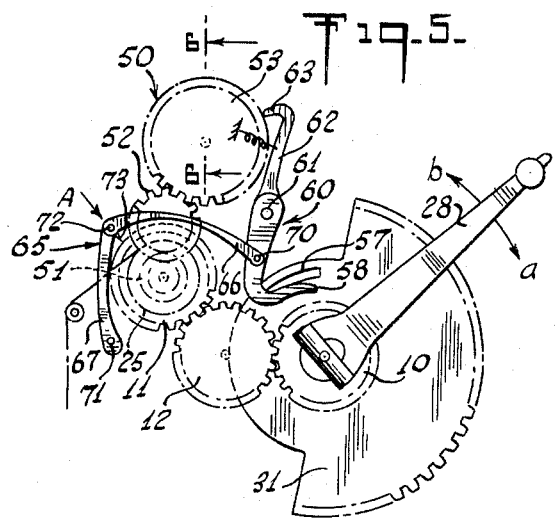
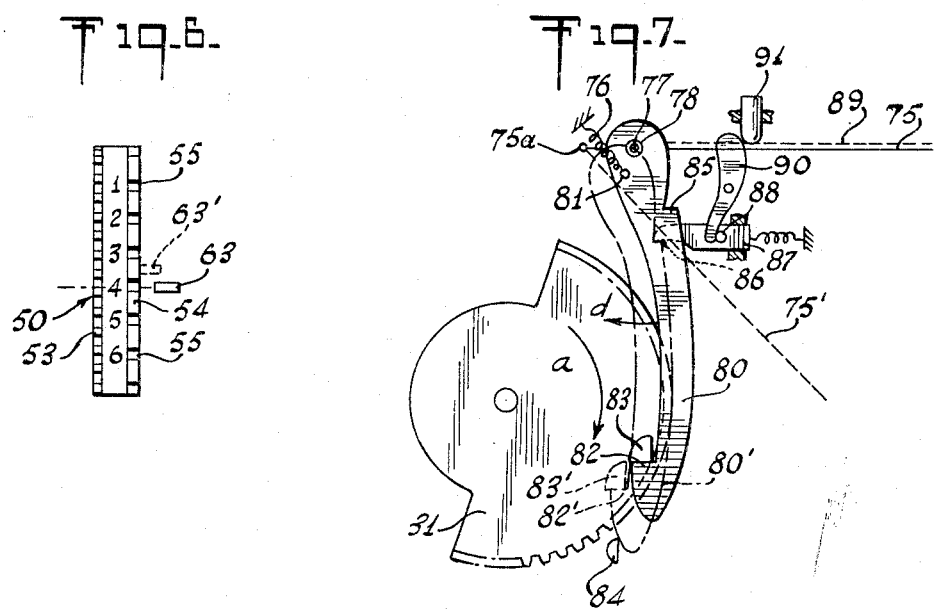

United States Patent Office 3,004,482
Patented Oct. 17, 1961

3,004,482
FILM AND SHUTTER WINDING MECHANISM FOR PHOTOGRAPHIC CAMERAS
Alex C. Muller, 421 7th Ave., New York, N.Y., assignor of fifty percent to Albert W. Moser, New York, N.Y.
Filed Oct. 28, 1959, Ser. No. 849,399
11 Claims. (Cl. 95—31)

The present invention relates to a mechanism for winding the film and shutter of a photographic camera and among the more general objects of the invention is the provision of a unidirectional or one-way gear drive suitable especially, though not limitatively, for use in film winding or feeding mechanism for photographic roll film cameras comprising a winding crank handle or the like member operable in one direction to actuate the film winding mechanism for feeding a section of the film to picture taking position, on the one hand, and operable freely in the reverse direction for returning said handle to a normal or rest position upon completion of a film feed or winding operation.

While the one-way gear drive of the invention has special use for and will be described in the following with reference to a photographic film feeding mechanism, it will become apparent that it will have numerous other uses and applications, where a unidirectional motion-transmitting or driving connection is desired between a driving member and a driven member in a predetermined direction and the drive is to be ineffective in the reverse or opposite direction, in the manner of a one-way or free-wheeling coupling well known in the art.

Known one-way friction clutches and free-wheeling or the like unidirectional drive or coupling devices have the disadvantage of being subject to slippage and other defects of a mechanical nature, resulting in errors in the control or adjustment of the driven device, such as the proper positioning of the film sections in a photographic camera, aside from the high cost of such devices if a minimum of failures or errors in the adjustments or controls is desired. As a result, the use of automatic film winding devices has been restricted in the past to high-priced cameras and has made it necessary to resort to manual or semi-automatic film feed control for cameras in the medium or lower price brackets. The same applies to other devices requiring a one-way clutch or coupling designed to control or adjust an output device to close tolerances by an input or control element.

Accordingly, an important object of the present invention is the provision of a unidirectional drive or mechanism utilizing ordinary gears for transmitting driving motion from an input or driving gear to an output or driven gear which is both simple in design and construction, reliable and accurate in operation and which can be fabricated at reduced cost compared with unidirectional or one-way coupling or motion-transmitting devices known in the art.

A more specific object of the invention is the provision of a simple one-way gear drive utilizing ordinary gears for the driving and driven members and an intermediate or coupling gear with means to automatically establish driving connection between said driving and driven gears by said intermediary gear in one direction of rotation and to interrupt the drive or coupling in the opposite direction of rotation of said driving gear.

Yet another object of the invention is the provision of a unidirectional or one-way gear drive of this type for coupling a pair of driving and driven members, whereby the degree or extent of lost motion between said members is reduced to a minimum.

Still another object of the invention is the provision of a simple and efficient film feeding mechanism for photographic roll film cameras adapted for simultaneous tensioning of the shutter, substantially without interference between the film feed and shutter winding operations.

Another object of the invention is the provision of a simple and efficient film measuring and control device associated with the film and shutter winding mechanism of a photographic camera, to automatically arrest the film feeding movement after the proper length or section of the film has been fed from one to the next frame in the picture gate of the camera.

Still another object of the invention is the provision of simple and efficient mechanism to lower and release the reflecting mirror of a single-lens reflex camera in proper synchronism with and controlled by the shutter winding and release means, respectively.

The invention, as to its ancillary objects as well as novel aspects, will be better understood from the following detailed description taken in reference to the accompanying drawings forming part of this specification and wherein:

FIG. 1A is a schematic diagram of the unidirectional gear drive of the invention comprising a driving gear, a driven gear and an intermediate or coupling gear, the arrangement being shown in the decoupling direction of the driving gear;

FIG. 1B is similar to FIG. 1, showing the gear drive in the coupling direction of the driving gear;

FIG. 2 is a diagrammatic view of a film feeding and shutter winding mechanism for a photographic roll film camera embodying a one-way gear drive or coupling according to the invention, the arrangement being shown in the starting position of the winding crank handle or the like operating member;

FIG. 3 is a partial view of FIG. 2, illustrating the tensioning of the shutter independently of the winding of the film;

FIG. 4 is an enlarged fragmentary view taken on line 4—4 of FIG. 2;

FIG. 5 is a further partial view of FIG. 2, illustrating the automatic film measuring and feed control mechanism actuated by and synchronized with the film and shutter winding controls in accordance with the invention;

FIG. 6 being an enlarged section on line 6—6 of FIG. 5 more clearly shows the notched film measuring and frame counter disc; and FIG. 7 shows schematically the operation of the reflecting mirror of a single-lens reflex camera by the shutter winding mechanism according to the invention.

Like reference characters denote like parts in the different views of the drawing.

With the foregoing objects in view, the invention involves principally the provision of a driving gear and a driven gear having rotational axes being fixed relative to one another and an intermediate or coupling gear arranged to automatically effect unidirectional motion-transmitting or driving connection between said driving and driven gears. For this purpose, the intermediate gear is rotatably mounted upon one end of a lever having a fixed pivot at its opposite end, the arrangement being such that the driving gear is in continuous meshing engagement with the intermediate gear. There is further provided a yielding friction coupling between said lever and said intermediate gear, in such a manner that rotation of the driving gear in one direction will be transmitted to said lever through said intermediate gear, to deflect the same and, in turn, said intermediate gear towards and into meshing engagement with said driven gear, thereby to establish driving or motion-transmitting connection between said driving and driven gears through said intermediate gear, while rotation of said driving gear in the opposite direction causes a deflection of said lever and, in turn, of said intermediate gear in the opposite direction or away from and into disengagement from said driven gear, to thereby interrupt the motion-transmitting or driving connection between said driving and driven gears, respectively.

As an example, if the driving gear is fixed to the film winding handle or the like operating member of a photographic roll film camera and the driven gear serves to operate the film take-up spool of the camera, it is possible in this manner to wind the film by rotating the handle in the forward or clockwise direction, to advance a desired section of the film to picture taking position, and to thereafter return the winding handle to starting or rest position by rotation in the reverse or anticlockwise direction. Arrangements of this type are especially suited for combination with the shutter tensioning operation, in that both operations may be started simultaneously from the same starting point of the handle or the like operating member. Further means may be provided to couple or engage a shutter winding gear or the like with the film winding gear at the start of a winding operation and to disengage the same upon completion of the shutter tensioning operation. The film feed may then be continued until the proper section of the film has been advanced to the picture taking position, substantially independently of the shutter tensioning or winding operation.

Referring more particularly to FIGS. 1A and 1B of the drawing, the numeral 10 indicates a driving gear, 11 is the driven gear and 12 the intermediate or coupling gear of the one-way drive mechanism. The coupling gear 12 is fixed to a spindle 13 which is journaled in a bore 14 provided in one end of a coupling lever 15 pivoted at its opposite end, as at 16, the rotational axes 10' and 11' of both the gears 10 and 11 and the pivot 16 being fixed relative to each other. Gear 12, being freely rotatable upon the lever 15, is yieldingly connected to or coupled with said lever through a friction connection in the form of a flat spring 17 or the like, whereby to impart initial rotational movement of the gear 10 to said lever through the intermediate gear 12 and friction coupling 17, in such a manner as to deflect the lever in a direction either way from gear 11, to disengage the gear 12 from the gear 11, that is, by anticlockwise rotation of the gear 10, as indicated by the arrow a, FIG. 1A, and vice versa, to deflect said lever in a direction towards the gear 11 or into meshing engagement of the gear 12 with the gear 11 by clockwise rotation of the gear 10, as indicated by the arrow b, FIG. 1B. In order to limit the deflecting movement of the lever 15, in particular in the direction away from the gear 11, suitable stop means 18 and 20 may be provided for either or both deflecting directions. As will be seen, by a proper design and location of the gears 10 and 11 as well as of the pivot 16 of the lever 15, one-way coupling or driving connection may be effected between the gears 10 and 11 with a minimum of play or lost motion, whereby to ensure close control or adjustment of the output or controlled device (film take-up spool etc.) connected to or operated by the gear 11.

Referring now to FIG. 2 of the drawings, there is shown schematically a film feeding and shutter tensioning or winding mechanism for a photographic roll film camera embodying a unidirectional or one-way gear coupling or drive according to the invention. In the drawing, which shows only the elements essential for the understanding of the invention, the driving gear 10 has fixed to it a winding crank handle 28 shown in the starting position (full line position) for commencing a film feed and shutter winding operation and being arranged for rotation or swinging movement to an inoperative or rest position 28' (dot-dash line position) about an axis x—x, in a manner well known and understood. The stop means for the coupling lever 15 is shown in the form of a fixed bracket 21 having a slot 22, FIG. 4, into which extends the spindle 13 of the intermediate or coupling gear 12, to limit the deflection of the lever to a predetermined angle in either direction, to ensure both intimate meshing engagement of the gear 12 with and disengagement from the gear 11 upon rotation of the handle 28 in the forward and reverse directions, as shown by arrows a and b, respectively. The friction or slip coupling between the gear 12 and lever 15 is shown in the form of a pin 24, FIG. 4, being freely mounted in a perforation of the lever 15 and arranged with one end engaging the face of the gear 12 and with its opposite end engaging one end of a flat spring 23 the other end of which is secured to the lever 15, as shown more clearly in the drawing. The pin 24 or the like friction coupling member consists advantageously of a wear-resistant material adapted to provide adequate frictional pressure, preferably a synthetic plastic known by the trade name of nylon, Teflon or an equivalent material.

The driven gear 11 is fixed to a film take-up spool 25 upon which is wound the film 26 from a supply spool 27 for advancing successive film sections into picture taking position in the film or picture gate 29 of the camera, in a manner well known and understood. It is thus possible, in a most simple and reliable manner, to wind or advance the film from one to the next frame or section by rotation of the handle 28 in the forward or clockwise direction, as indicated by the arrow a, and to return the handle to its starting or rest position by rotation in the reverse or anticlockwise direction, as indicated by the arrow b, after completion of each film feed movement or operation.

The control of the film feed may be either manual by observing in a known manner the frame numbers on the film paper backing appearing in the red viewing window in the rear wall of the camera or, alternatively, the winding may be automatic by the provision of a film measuring and stopping device in the form of a notched counter wheel, as described in greater detail hereafter.

According to an improved feature of the invention, the winding of the film may be combined or coupled with the tensioning of the shutter by temporarily coupling the winding handle or gear 10 with the shutter winding mechanism at the instant of starting of a film winding operation and by releasing or disengaging the coupling upon completion of the shutter tensioning or winding operation, in such a manner as to allow of continued and independent winding of the film to the proper position in the film gate for the taking of the next picture. This releasable coupling between the film and shutter winding mechanism is necessary for the reason that it usually takes a greater turning angle for winding the film compared with the angle for winding the shutter and that, furthermore, the film winding angle is variable and decreases as more and more frames or sections of the film are unwound from the supply spool 27 and wound unto the take-up spool 25.

There is shown for this purpose and by way of example a known focal plane type shutter mechanism comprising a pair of concentric coupling gears 30 and 31 being in meshing engagement with the winding gears 32 and 33 for a pair of shutter curtains 34 and 35 wound upon winding rollers connected to the gears 32 and 33 and being passed across the picture gate 29 and having their opposite ends fixed to a pair of take-up rollers 36 and 37, respectively, in a manner well known with focal plane shutters of this type. The curtains 34 and 35, being provided in a known manner with suitable picture apertures, are under spring tension while being wound upon the gears 32 and 33 or rollers connected thereto, further suitable means being provided (not shown) for first releasing the front curtain upon operation of a release button or the like exposure control element of the camera and for subsequently releasing the rear curtain at a definite and adjustable time interval from the release of the first curtain, in such a manner as to cause a light or exposure slit of corresponding width to move across the picture area in the image gate 29 and to result in a definite exposure by the light reaching the film from the scene or subject through the lens of the camera. In order to enable the sequential release of the curtains 34 and 35 or an independent return of the coupling gears 30 and 31 upon release of the shutter, the gears 30 and 31 are shown connected through a slot and pin coupling 38, 38' or the like, to allow of both gears to be rotated together in the forward or winding direction of the curtains 34 and 35, while enabling of an independent or sequential release and return of the gears and, in turn, of the curtains to the starting position, in a manner well known to and understood by those skilled in the art.

Coupling with and release of the gears 30 and 31 from the film winding mechanism is effected, in the example shown, by a pawl 40 pivoted at 41 upon the upper coupling gear 31, said pawl having a nose 43, FIG. 3, engaging a stop or projection 44 upon the gear 10 in the starting position of the handle 28, FIG. 3.

A further stop 46 arranged upon the cover or side wall of the camera and camming with the extension 40' of the pawl 40 causes the nose 43 to engage the projection 44 in the starting position of the handle 28, as shown in full lines in FIG. 3. A fixed stop 45 serves to disconnect the shutter winding mechanism from the film winding mechanism upon completion of the shutter tensioning operation, in the manner further described in the following.

More specifically, rotation of the handle 28 in the forward or clockwise direction (arrow $a$) causes both in advance of the film 26 and tensioning or winding of the shutter, in the manner described. After the shutter has been fully wound, the end 40' of the pawl 40 opposite from the nose 43 engages the stop 45, whereby to temporarily disengage said nose from the projection 44 by a brief rotation of the pawl in anticlockwise direction, thus disengaging the winding handle 28 from the shutter winding mechanism. The winding of the film may then be continued until the next frame or section has been advanced to the proper picture taking position, either manually or by the automatic film winding control described hereafter.

As pointed out before, the exposure of the film is determined by the width of the light slit formed by the curtains 34 and 35 and controlled by the interval between the release of the front curtain, upon actuation of the exposure release button or the like of the camera, and the sequential release of the rear curtain, in a manner known and readily understood. In the example shown, the control of this time interval and, in turn, of the exposure is effected by a triggering element 51 mounted upon an endless flexible wire or cable 47 being wound upon and unwound from one of the shutter coupling gears or a separate disk connected therewith. As a consequence, the element 51 moves along a substantially straight path during the unwinding of the first (front) curtain and cooperates with a release element 52 adjustably mounted along said path, in the manner described in greater detail in my copending patent application Serial No. 715,006, filed February 13, 1958, entitled Focal Plane Shutter for Photographic Cameras which is hereby incorporated by reference in the present description.

Element 52, which may be adjusted according to an exposure scale 54, upon engagement with the element 51 rotates the shaft or rod 53 about its longitudinal axis which results in the release of the second or rear curtain of the shutter, in the manner more clearly described in the aforementioned patent application. In the latter, the cable 47 additionally serves as a winding means for the shutter, while in the example of FIG. 2 of the present application the shutter is wound by means of the separate winding or coupling gears 30 and 31 and the cable 47 merely serves to operate the tripping elements 51, to initiate the sequential release of the second or rear curtain of the shutter, in the manner described.

Referring to FIGS. 5 and 6, there is shown an improved film measuring and control mechanism, to automatically stop the film winding operation after a new frame or film section has been advanced to picture-taking position in the film gate 29, FIG. 2. For this purpose, the film winding gear 11 or take-up spool 25 drives a film measuring and indicator wheel 50 through suitable reduction gears 51, 52 and 53, the latter forming part of the wheel 50 which further comprises a section or disc 54 provided with peripheral notches or radial depressions 55 spaced in accordance with the proper rotational angles required to advance successive sections of the film to picture-taking position by rotation of the handle 28. As will be understood, the notches 55 are spaced non-uniformly upon the peripheral rim of the disc 54 due to the decreasing rotational angles required to advance the same film lengths or sections, as more and more of the film is wound upon the take-up spool 25.

Connected to the shutter winding gear 31 is a cam 57 adapted to cooperate with the curved arm or end 58 of a double-arm lever 60 pivoted at 61 and having a cooperating arm 62 terminating in a projection or detent 63 arranged to engage the notches 55 of the disc 54 of the film measuring wheel 50. In the rest position of the winding lever 28 as shown in the drawing, the cam 57 causes the lever 61 to be deflected in clockwise direction against the action of a biasing spring (not shown), whereby to disengage the detent 63 from the opposite notch 55 of the wheel 50. In FIG. 6, the detent 63 is shown laterally of or at right angle to the face of the wheel 50, rather than radially, for the sake of better illustration.

In operation, as a film winding operation is commenced by rotation of the handle 28 in the direction $a$, the cam 57, by suitable shaping of the engaging surfaces of the members 57 and 58, causes the lever 60 to remain in the position shown for a brief initial rotational movement of the gear 31, whereby to allow the wheel 50, being coupled with the winding handle through the unidirectional gear drive 10, 11, 12 and the reduction gearing 51, 52, 53, to rotate to a position where the detent 63 is out of registry with the notch 55 of the disc 54. Continued rotation of the handle 28 then causes disengagement of the lever arm 58 from the cam 57, whereby to result in the detent 63 being deflected into engagement with the rim or peripheral part of the disc 54, as indicated at 63' in FIG. 6. In the latter, the detent 63 has been shown shifted relative to the wheel 50, rather than the reversed relation, for better illustration.

After the proper length of the firm has been advanced to position the next frame or section in the film gate 29, the detent 63 will engage the next notch 55 of the disc 54, thus stopping the film winding movement and causing the proper indicator number to appear in a window in the camera casing, in the manner well known and understood. The sequential operation of the detent 63, that is, first into engagement with the rim and thereafter into engagement with the next following notch 55 of the disc 54, has the advantage, among others, that the lever 60 and detent 63 may be deflected to a safe disengaged position from the wheel 50 by the return of the shutter winding gear 31 and through the action of the cam 57, on the one hand, while ensuring a positive and instant engagement of the notches 55 of the disc 54 by the detent 63, to arrest the winding operation, with a minimum of play or lost motion upon termination of the successive film feeding operations.

As described thus far, the wheel 50 serves both as a film frame counter and stopping means for the film winding operation. In order to prevent premature wear and inaccurate film feed control, as well as other defects, there is provided, according to the improved construction shown, a separate relief or locking mechanism, to additionally stop or lock the film winding operation simultaneously with the engagement of a notch 55 by the detent 63. There is shown, for this purpose, an angular linkage 65 comprising a pair of links or arms 66 and 67. One end of the arm 66 is pivoted to an intermediate point of the lever arm 58, as at 70, while one end of the link 67 has a fixed pivot 71. The remaining ends of the links 66 and 67 are pivotally connected with one another at 72 and provided with a ratchet 73 adapted to engage the interdental space between two teeth of the winding gear 11. As a consequence, deflection of the lever 60 in anticlockwise direction and engagement of the detent 63 with a notch 55 of the disc 54 causes the pivot 72 to move in the direction of the arrow A, resulting in the ratchet 73 engaging and positively locking the gear 11 of the film winding mechanism. Upon subsequent release of the shutter, gear 31 returns to the position shown by rotation in the direction $b$, whereby to cause the detent 63 to be disengaged from the counter disc 54 by the cam 57 engaging the lever arm 58, while at the same time retracting the ratchet 73 by the linkage 66, 67, to enable a subsequent film winding and shutter tensioning operation. There are thus prevented both double exposures as a result of the film winding and shutter interlock, on the one hand, as well as blank frames due to the automatic film measuring or feed control coupled with the shutter operation, on the other hand.

While a focal plane shutter has been shown and described for illustration, it will be understood that the film winding device according to the invention may be releasably coupled or connected with any other type of shutter winding or tensioning mechanism, to enable a simultaneous yet independent film feed and shutter tensioning operation, in the manner shown.

Referring to FIG. 7, there is shown an improved and simplified reflecting mirror actuating mechanism according to the invention operated by and synchronized with the shutter winding and release control, respectively. This is achieved by means of a single operating lever or control member, whereby to result in a substantial saving of parts and reduced cost, compared with conventional shutter and reflecting mirror controls for single-lens reflex cameras.

In the drawing, the numeral 75 indicates the reflecting mirror of a camera in the retracted or picture-taking position prior to the release and operation of the shutter, to allow the light from the object or scene to be photographed to pass through the lens to the sensitive plate or film in the image or picture gate 29, FIG. 1, in a manner well known. The mirror 75 being pivoted at one end, as at 75$a$, is normally urged to the retracted or picture-taking position shown by a return or biasing tension spring 76 in a manner further described presently. Provided at the lateral edge of the mirror 75 at a distance from the pivot 75$a$ is a projecting pin or stud 77 engaging a perforation 78 of one end of an operating lever 80, whereby to pivotally connect the latter with the mirror 75. Lever 80 is provided with a stud 81 or the like spaced and being laterally offset from the pivot or pin 77 and serving as a means for securing one end of the return spring 76 which has its opposite end fixed to the camera casing. As a consequence, the force exerted by the spring upon the lever 80 has two components, one urging the lever and with it the mirror 75 upwardly to the (picture-taking) position shown and the other tending to rotate the lever in clockwise direction, as indicated by the arrow $d$ in the drawing. As a result, the nose 82 at the opposite end of the lever 80 is urged into engagement with the projection 83 upon the shutter winding gear 31 connected with the front shutter curtain in the manner described, whereby to establish motion-transmitting connection between the shutter winding mechanism and the reflecting mirror 75.

In operation, as the shutter winding operation is commenced by rotation of the gear 31 through the crank handle 28 in the direction of the arrow $a$, in the manner described, the lever 80 will be both rotated and displaced downwardly, whereby to cause the mirror 75 to be lowered by virtue of its coupling with the lever 80 through pin 77, until reaching the fixed stop or abutment 84 engaging the lower end of the lever, as shown in broken lines at 80' in the drawing. At this time, the mirror 75 has reached the viewing position shown by the broken line 75', that is, forming a 45° angle with the lens axis, whereby to reflect a picture of the subject or scene to be photographed unto the ground glass or viewing screen 89 of the camera, in the manner well known and understood. Upon arresting of the lever 80 by the stop 84, the projection 83' upon the gear 31 is allowed to slide off the nose 82', whereby the shutter winding and film feed operations may be continued independent of the reflecting mirror control.

During this operation, the spring 76 has been tensioned and, in order to prevent the lever 80' and mirror 75' from returning to the starting position 80 and 75, respectively, the former is provided with a further nose or ratchet 85 being engaged by a spring-urged pawl 86 at the end of the mirror lowering operation. Pawl 86 is mounted upon or integral with a slide 87 having an upstanding pin 88 arranged to cam with one arm of a double-arm lever 90 the opposite arm of which, in turn, forms a cam being engaged by the shutter release button 91 or the like operating member. As a consequence, after the mirror has been lowered and locked by the pawl 86, in the manner described, and the shutter tensioned as well as the film fed to the next picture-taking position, all by rotation of the handle 28, operation of the shutter release button 91 results in a disengagement of the pawl 86 from the lever 80' by deflection of the lever 90, whereby to cause the lever 81' and, in turn, the mirror 75' to return to the picture-taking position 80 and 75, respectively, by the action of the spring 76.

The mirror return movement by the spring 76 may, in turn, release a detent member (not shown) of the front shutter curtain winding gear which, in turn, may release the rear curtain winding gear in predetermined timed sequence, to result in a definite exposure, such as in the manner described in greater detail in the abovementioned copending application.

There is thus provided by the invention a simple, integrated and low-cost mechanism for the simultaneous operation of the shutter, film winding device and reflecting mirror on a single-lens reflex camera.

In the foregoing, the invention has been described with reference to specific illustrative devices. It will be evident, however, that variations and modifications, as well as the substitution of equivalent elements and parts for those shown herein for illustration may be made, without departing from the broader scope and spirit of the invention as set forth in the appended claims. The specification and drawing are accordingly to be regarded in an illustrative rather than a restrictive sense.

I claim:

1. In a photographic roll film camera having film supply and take-up spools, film winding mechanism comprising a winding crank handle, a driving gear connected to said handle, a driven gear connected to said take-up spool, the rotational axes of said gears being fixed relative to one another, a lever having a fixed pivot relative to said gears, an intermediate gear rotatably mounted upon said lever at a predetermined distance from said pivot, to maintain said intermediate gear in continuous meshing engagement with said driving gear and to cause rotation of said driving gear by said handle in one direction to deflect said intermediate gear towards and into meshing engagement with said driven gear, for advancing consecutive film sections from said supply spool to picture taking position, and to cause rotation of said driving gear by said handle in the opposite direction to deflect said intermediate gear away and into disengagement from said driven gear, to thereby enable said handle to be returned to a predetermined starting position upon completion of each film winding operation.

2. In film winding mechanism as claimed in claim 1, including means to provide a yielding friction connection between said intermediate gear and said lever.

3. In film winding mechanism as claimed in claim 2, said last means being comprised of a friction element arranged with one end engaging said gear and freely passing through an opening of said lever, and spring means secured to said lever and resiliently engaging the opposite end of said element.

4. In film winding mechanism as claimed in claim 2, said last means being comprised of a pin of synthetic plastic material arranged with one end engaging said gear and freely passing through a perforation in said lever, and a flat spring having one end secured to said lever and arranged with its opposite end resiliently engaging the opposite end of said pin.

5. In film winding mechanism as claimed in claim 1, including stop means to limit the deflection of said lever in at least the direction away from said driven gear.

6. In film winding mechanism as claimed in claim 1, including stop means to limit the deflection of said lever in the directions towards and away from said driven gear.

7. In a photographic roll film camera having film winding mechanism and shutter winding means, a film supply spool, a take-up spool for winding a film thereon from said supply spool, film winding and shutter tensioning mechanism comprising a winding handle, a driving gear connected to said handle, a driven gear connected to said take-up spool, the rotational axes of said gears being fixed relative to one another, a lever having a fixed pivot relative to said gears, an intermediate gear rotatably mounted upon said lever at a predetermined distance from said pivot, to maintain said intermediate gear in continuous meshing engagement with said driving gear and to cause rotation of said driving gear by said handle in one direction to deflect said intermediate gear towards and into meshing engagement with said driven gear, for advancing consecutive film sections to picture taking position, and to cause rotation of said driving gear by said handle in the opposite direction to deflect said intermediate gear away and into disengagement from said driving gear, to enable said handle to be returned to a predetermined rest or starting position upon completion of each film winding operation, means to provide a yielding friction connection between said intermediate gear and said lever, and further means coupling said driving gear with said shutter winding means in the rest position of said handle, to simultaneously advance the film and to wind the shutter during each film feeding operation.

8. In film feeding and shutter winding mechanism as claimed in claim 7, means to release said last-mentioned coupling means upon completion of a shutter winding operation, to enable winding of the film to picture taking position independently of the winding of the shutter.

9. In film feeding and shutter winding mechanism as claimed in claim 8, said shutter winding means including a winding gear and said last means being comprised of a pawl rotatably mounted upon said winding gear and resiliently engaging a projection of said driving gear in the rest position of said handle, to establish driving connection between said driving gear and the shutter winding mechanism, and further stationary stop means to deflect said pawl upon reaching the fully wound position of the shutter by said winding gear, thereby to disengage said winding gear from said driving gear and to enable completion of the film winding operation independently of the shutter winding.

10. In film feeding and shutter winding mechanism as claimed in claim 7, said friction connecting means being comprised of a pin of synthetic plastic arranged with one end engaging said gear and freely passing through a perforation of said lever, and a flat spring having one end secured to said lever and having its opposite end resiliently engaging the opposite end of said pin.

11. In film feeding and shutter winding mechanism as claimed in claim 7, including stop means to limit the deflection of said lever in either direction away from and towards said driven gear.

References Cited in the file of this patent
UNITED STATES PATENTS

| | | |
|---|---|---|
| 1,177,243 | Goold | Mar. 28, 1916 |
| 1,451,266 | Ljunstrom | Apr. 10, 1923 |
| 2,094,669 | Pratt | Oct. 5, 1937 |
| 2,518,723 | Rossmann | Aug. 15, 1950 |
| 2,575,012 | Harvey | Nov. 13, 1951 |
| 2,621,866 | Harvey | Dec. 16, 1952 |
| 2,652,210 | Hodges | Sept. 15, 1953 |
| 2,891,454 | Sauer et al. | June 23, 1959 |
| 2,906,184 | Hennig et al. | Sept. 29, 1959 |